3,420,998
USE OF GAMMA RAY AND THERMAL NEUTRON WELL LOGS TO CORRECT MACROSCOPIC ABSORPTION CROSS SECTION MEASUREMENTS

William R. Mills, Jr., Dallas, Tex., assignor to Mobil Oil Corporation, a corporation of New York
Filed Sept. 17, 1965, Ser. No. 488,137
U.S. Cl. 250—83.3      6 Claims
Int. Cl. H01j 39/32

ABSTRACT OF THE DISCLOSURE

The specification discloses a technique and system for producing and utilizing gamma ray and thermal neutron logs to correct macroscopic absorption cross section measurements obtained in pulsed neutron well logging operations. In the embodiment disclosed, there is provided a well logging system including a pulsed neutron source, a thermal neutron detector, and a gamma ray detector for obtaining the thermal neutron and gamma ray logs. The macroscopic absorption cross section measurements are obtained from thermal neutrons detected. Correction is carried out by forming the ratio between the thermal neutron and gamma ray logs and multiplying this ratio by the macroscopic absorption cross section measurements.

---

Figure 1:
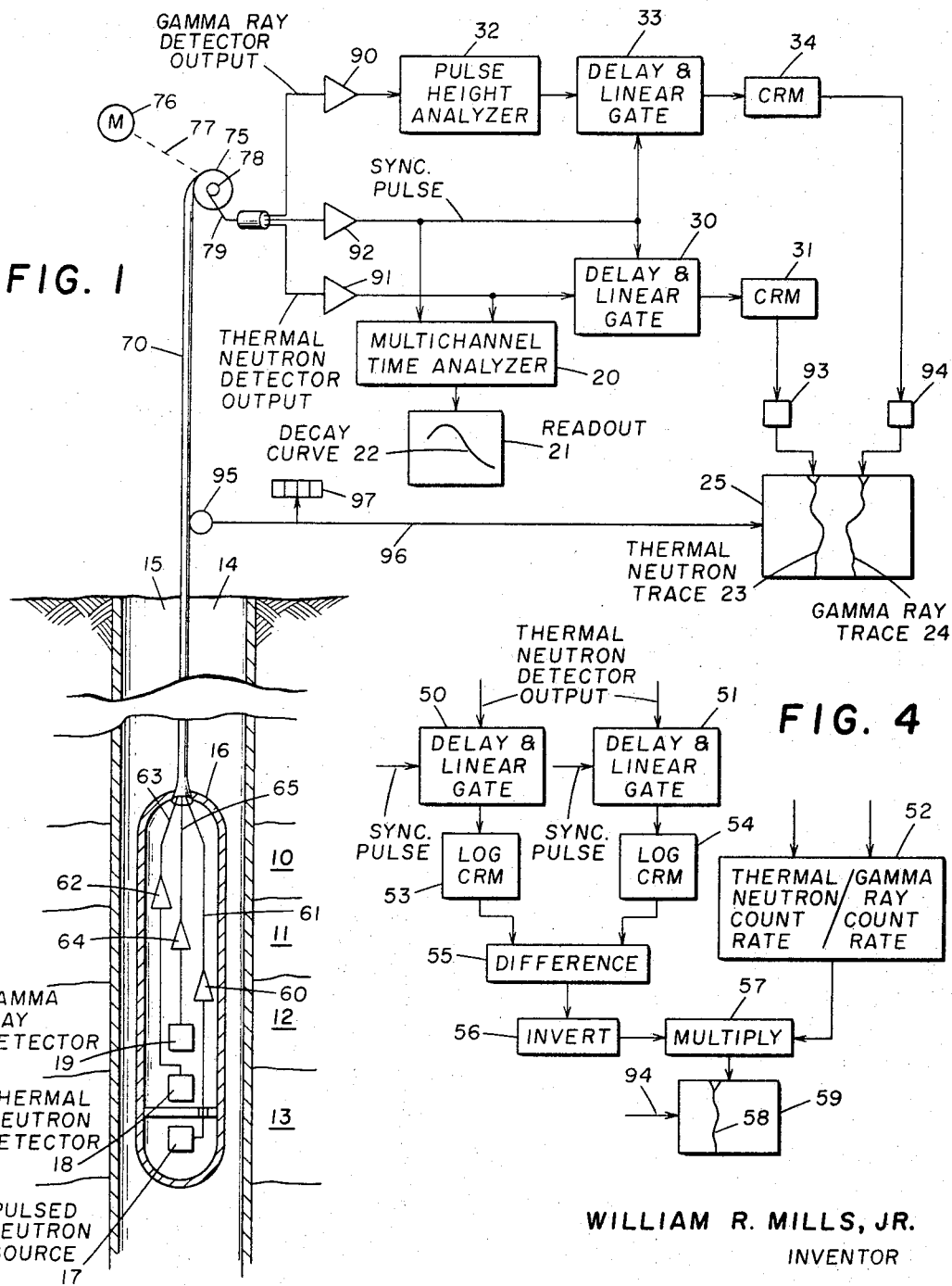

This invention relates to a technique for producing and utilizing in combination gamma ray and thermal neutron logs, and mean life or half life measurements for distinguishing between various formations traversed by a borehole and, more particularly, to a technique for distinguishing between different formations having similar macroscopic absorption cross section, such as shaly sand containing oil and a clean sand containing salt water.

In pulsed neutron well logging operations, thermal neutron mean life or half life measurements indicative of the macroscopic absorption cross section are obtained to distinguish between salt water- and oil-bearing formations. Such measurements may be obtained from thermal neutrons or as an alternative from thermal-neutron capture gamma rays.

The basis of oil-salt water differentiation by the mean life technique has been that salt water contains chlorine which is a highly absorbent element for thermal neutrons. Thus, formations containing salt water are expected to have a much larger macroscopic absorption cross section for thermal neutrons thereby resulting in a shorter thermal neutron mean life than an identical formation matrix containing oil. Measurements of this type are the subject of extensive investigation in present day research and operations since they are very sensitive to formation changes based upon changes in the absorption cross section and further allow quantitative measurements of the cross section to be obtained.

It has been found, however, that in many instances oil sands may be contaminated with shale from nearby shale formations. It has been found further that shale frequently exhibits an extremely short mean life and hence must contain an element such as boron, rare earths, or other elements which readily absorb thermal neutrons. In many instances, a shaly sand containing oil may exhibit the same mean life as a clean sand containing salt water. Thus, it is difficult, if not impossible, to distinguish between such formations on the basis of mean life or half life measurements alone.

In accordance with the present invention, there is provided a unique technique employing, in combination, continuous gamma ray and thermal neutron logs and mean life or half life measurements for differentiating between formations of the type mentioned above. In the well logging technique, the formations are irradiated with bursts of fast neutrons spaced in time and the resulting thermal neutrons and thermal-neutron capture gamma rays are detected. Measurements are produced representative of the intensity of thermal neutrons and thermal-neutron capture gamma rays detected. In addition, from the radiation detected there is produced a measurement which in one embodiment is representative of the thermal neutron mean life. Reference is made to this measurement to obtain information about the macroscopic absorption cross section of the materials in the formations for thermal neutrons. In carrying out the invention, reference is made also to the thermal neutron and gamma ray measurement to obtain additional information. For example, in a formation where the macroscopic absorption cross section observed is relatively large, reference may be made to the gamma ray and thermal neutron measurements to determine whether salt water or shale is contributing to the macroscopic cross section measured. In this example, the gamma ray measurement produced is made selectively sensitive to chlorine while the thermal neutron measurement is sensitive to the total chemistry effect, thereby providing supplementary information for shale-salt water distinction.

It is a further embodiment, the mean life or half life measurement indicative of the macroscopic absorption cross section may be corrected by comparing the gamma ray and thermal neutron intensity measurements to obtain a correction function having a value which varies in one direction when shale is present in the formation and in an opposite direction when salt water is present. This correction function is then employed to modify the macroscopic measurement to obtain a corrected measurement which reflects a relatively low macroscopic absorption cross section when shale is present and a relatively large macroscopic cross section when salt water is present.

Figure 2:
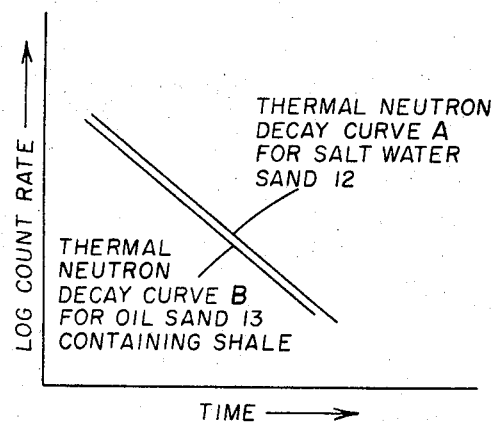
Figure 3:
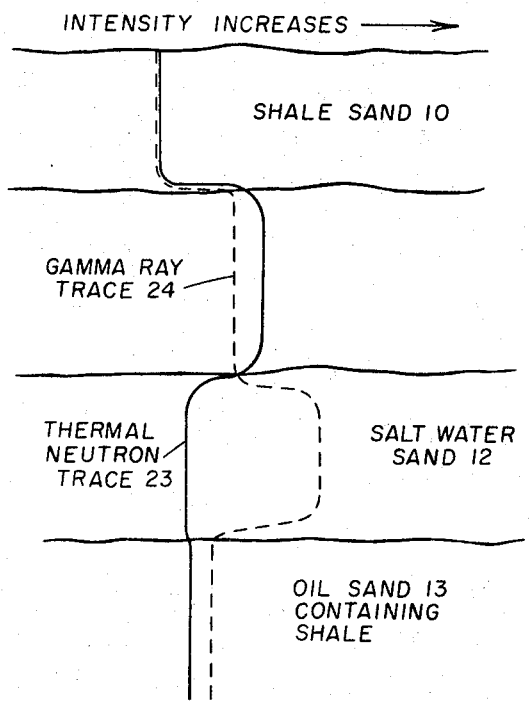

For further objects and advantages of the present invention and for a more complete understanding thereof, reference may now be had to the following detailed description taken in conjunction with the accompanying drawings, wherein:

FIGURE 1 represents a system for carrying out the well logging technique of the present invention;
FIGURES 2 and 3 represent curves useful in understanding the present invention; and
FIGURE 4 illustrates a modification of the system of FIGURE 1.

Referring now to FIGURE 1 of the drawings, there will be described the technique and system of the present invention for investigating unkown formations. The formations of interest may be those illustrated at 10, 11, 12, and 13, traversed by a borehole 14, lined with iron casing 15. In carrying out the method, a borehole tool 16 containing a pulsed neutron source 17, a thermal neutron detector 18, and a gamma ray detector 19, which may be of the scintillation type, is lowered into the borehole. Neutrons from the source pass into the formations where they are slowed to the thermal level. Thermal neutrons and thermal-neutron capture gamma rays from the formations in turn are detected, respectively, by detectors 18 and 19. The output from the thermal neutron detector is transmitted to the surface to a multichannel time analyzer 20 coupled to a readout 21 which are employed to obtain a thermal neutron decay curve 22. This curve may be employed to obtain mean life or half life measurements indicative of the macroscopic absorption cross section by obtaining a semilogarithmic plot of the curve as illustrated, for example, by the curves of FIGURE 2, or by calculations from data obtained from the curve. Two continuous traces recorded from the thermal neutrons detected within two time windows may also be employed to obtain the same information. The macroscopic absorption cross section measurements obtained, as described above, are employed in combination with continuous thermal neutron and gamma ray traces, illustrated at 23 and 24, respectively, and recorded by continuous trace recorder 25 for distinguishing between the various formations.

In this respect, the output of the thermal neutron detector is applied to recorder 25 by way of delay and linear gate 30 and count rate meter 31 while the output of the gamma ray detector is applied to recorder 25 by way of single channel pulse height analyzer 32, delay and linear gate 33, and count rate meter 34. Delay and linear gates 30 and 33 are adjusted each for response, respectively, to the thermal neutrons and gamma rays detected within a single time window after each neutron burst. In addition, the pulse height analyzer 32 is adjusted to discriminate against prominent gamma rays emitted from shale while being selectively responsive to prominent gamma rays emitted from chlorine of salt water. With the arrangement and adjustment disclosed, the thermal neutron trace thus is expected to reflect a low intensity when obtained both in shale and salt-water formations, while the gamma ray trace is expected to reflect a low intensity when obtained in a shale formation and a high intensity when obtained in a salt-water formation. Preferably, the two traces 23 and 24 are normalized with the tool 16 opposite a reference shale formation, whereby the two traces reflect the same excursion in the reference shale.

Referring to FIGURES 2 and 3, there will be described the manner in which the lifetime or decay measurements and the gamma ray and thermal neutron traces are employed in combination to distinguish between the various formations.

In FIGURE 2, the curves A and B are semilogarithmic decay curves of thermal neutrons obtained by pulsed neutron operations in two different formations. As indicated above, measurements of this type or mean life or half life measurements obtained therefrom, are of primary interest today compared to steady state logging, due to their higher sensitivity to formation changes. In such operations, it is the slope of decay curve which is employed to distinguish between the various formations, the slope being directly proportional to the macroscopic absorption cross section and having different values in different formations. The curves of FIGURE 2, however, illustrate a significant exception where the slope alone or the main life or half life obtained therefrom cannot distinguish between the formations. In this example, both of the curves are understood to reflect a relatively large macroscopic cross section, curve A being exemplary of one obtained in salt-water sand 12, while curve B is one which may be obtained in an oil sand 13 containing shale. As is evident, if one relied on the slope alone, formation 13 probably would be mistaken for a salt-water sand and hence passed by in the investigation.

In accordance with the present invention, reference may be had to traces 23 and 24 to supplement the lifetime or decay measurements of FIGURE 2 to aid in identifying the elements in the formations contributing to the slopes or macroscopic cross sections observed. In this respect, in FIGURE 3 traces 23 and 24 are idealized thermal neutron and gamma ray traces obtained, respectively, in formations 10–13. In formations 12 and 13 it can be seen that the excursions of the thermal neutron trace are essentially the same; however, the gamma ray trace 24 reflects relatively high intensity in formation 12 and a relatively low intensity in formation 13. Excursions of this nature indicate to the log analyst that although the mean life or absorption cross section of the two formations 12 and 13 are essentially the same, formation 13 evidently is not a salt-water sand and in fact may contain oil due to the low gamma ray intensity recorded therein.

Thus, the two continuous traces 23 and 24 are employed to supplement the mean life or half life measurements in that they may aid in locating oil formations which otherwise may be undetected. In this respect, the thermal neutron trace is employed as a reference with respect to the gamma ray trace to obtain meaningful information therefrom, both the gamma ray and thermal neutron traces recorded as disclosed being more sensitive than the conventional steady state traces since obtained in pulsed neutron operations.

In the above-described technique, the main life or half life measurements were interpreted or corrected by visually referring to the gamma ray and thermal neutral traces produced.

Referring now to FIGURE 4, there will be described an electronic system employing gamma ray and thermal neutron measurements for correcting, during logging mean life or half life measurements continuously produced whereby these measurements alone may be employed to distinguish between salt water- and oil-bearing formations containing shale. In the embodiment shown in FIGURE 4, the output from the thermal neutron detector is applied, respectively, to delay and linear gates 50 and 51 while the outputs of the count rate meters 31 and 34 are applied to a ratio-taking device 52. Delay and linear gates 50 and 51 are adjusted for response to thermal neutrons detected within two separate time windows following the end of each neutron burst. The outputs of the circuits 50 and 51 are applied to log count rate meters 53 and 54, both coupled to a difference circuit 55. These circuits solve the following equation:

$$\lambda = \frac{\ln\left(\frac{C_1}{C_2}\right)}{t_2 - t_1} = \frac{1}{\tau} \tag{1}$$

wherein:
$\lambda$ is the decay constant;
$\tau$ is the mean life;
$C_1$ and $C_2$ are the cumulative counts observed, respectively, within equal time periods $\Delta t_1$ and $\Delta t_2$, within a plurality of cycles, beginning, respectively, at $t_1$ and $t_2$ following a time zero, which may be the end of each burst of irradiation; and
$\ln$ is the natural logarithm.

The output of difference circuit 55 is equal to $$\ln C_1 - \ln C_2, \text{ or } \ln\left(\frac{C_1}{C_2}\right) \tag{2}$$

and is representative of the decay constant since $t_2$ and $t_1$ are maintained constant. To obtain a measure of the mean life, the decay constant is inverted at 56. As indicated previously, the mean life is representative of the total macroscopic cross section of the formation; however, it cannot distinguish between clean sands containing salt water and oil sands containing shale when the macroscopic cross sections are the same.

In accordance with the present invention, correction of the mean life is carried out by obtaining the ratio of the thermal neutron count rate to the gamma ray count rate with circuit 52 and multiplying this ratio, at circuit 57, with the mean life obtained from circuit 56. The corrected mean life is recorded as trace 58 by recorder 59 and will reflect a small macroscopic cross section when shale is present and a relatively large macroscopic absorption cross section when salt water is present, thereby allowing one to distinguish possible oil-bearing formations which otherwise would appear to contain salt water.

The manner in which the correction function from circuit 52 operates on the mean life is as follows. If salt water is present, a short mean life measurement is obtained from circuit 56 while a small ratio of neutrons to gamma rays is obtained from circuit 52. Multiplication of the small ratio with a short mean life does not affect the mean life to a great extent, as far as interpretation is concerned. If shale is present, however, the ratio of thermal neutrons to gamma rays from circuit 52 will increase, while the mean life as obtained from circuit 56 will remain nearly the same. Multiplication of the increased ratio will increase the mean life, thus providing an indication that possibly oil is present rather than salt water.

A detailed description of the instrumentation employed to carry out the present invention now will be given. Referring to FIGURE 1, the pulse neutron source 17 may be a conventional D–T neutron tube including a suitable triggering circuit for periodically actuating the neutron tube and for obtaining a synchronizing pulse for actuating the measuring instrumentation. The gamma ray and thermal neutron traces obtained with such a source will contain meaningful information for interpreting the mean life measurements. In a further alternative, the source 17 may be a mechanically pulsed source employing a shutter, rotated, by a suitable electric motor, between polonium sources and beryllium targets. A source of this type is disclosed in United States patent application Ser. No. 396,778, by Richard L. Caldwell and Wyatt W. Givens, filed Sept. 15, 1964, and reliably produces a substantially constant number of fast neutrons per burst. In this embodiment, the shutter will have suitable apertures extending therethrough to allow alpha particles from the polonium sources periodically to pass to the targets upon rotation of the shutter for the production of bursts of fast neutrons spaced in time. The shutter also may have a separate aperture extending therethrough in order to obtain a sync pulse from a suitable sensor. The sync pulses may be amplified at 60 and applied to the surface by way of the conductor 61. In one embodiment, the pulsed neutron source may be operated to produce suitable bursts of neutrons spaced about 1200 microseconds apart.

Thermal neutron detector 18 may comprise a plurality of helium-3 detectors at superatmospheric pressures. The ouput of the detector is applied to the surface by way of an amplifier 62 and conductor 63. The gamma ray detector 19 may comprise a sodium iodide scintillation crystal coupled to a photomultiplier tube whose output is amplified at 64 and applied to the surface by way of cable conductor 65. The two detectors are suitably positioned in the tool 16 in order to obtain the desired thermal neutron and thermal-neutron capture gamma ray measurements. Although not shown, suitable power supplies will be employed in the borehole tool to supply energizing power to the various instruments. The power supplies in turn may be energized from a source employed uphole (not shown) and coupled to the borehole tool by way of suitable conductors also not shown.

The borehole tool 16 is moved through the borehole by way of cable 70 which is wound and unwound upon a drum 75, driven by motor 76 and mechanical connection 77. At the surface, the outputs from the various cable conductors are applied to a plurality of slip rings and brush arrangements, one of which is illustrated, respectively, at 78 and 79. The gamma ray detector output is amplified at 90 before application to the pulse height analyzer 32, while the themal neutron detector output is amplified at 91 before application to the gate 30. Surface amplifier 91 or the borehole amplifier 62 may include an integral discriminator for discriminating against low-level noise. The sync pulse is amplified at 92 before application to the instrumentation including delay and linear gates 30 and 33, multichannel time analyzer 20, and delay and linear gates 50 and 51 of FIGURE 4.

In operating the system of FIGURE 1, selective response to chlorine gamma rays may be obtained by adjusting the analyzer 32 for response only to gamma rays having energies above about 2.3 m.e.v. This adjustment not only discriminates against the 478 k.e.v. gamma rays from boron, suspected to be present in shale, but also against the 2.23 m.e.v. gamma rays from hydrogen.

The delay and linear gates 30 and 33 may be adjusted each to allow passage of pulses within a single time window which may be of the order of 100 microseconds or more beginning, for example, at about 700 microseconds following the end of each neutron burst.

In order to normalize the two traces 23 and 24 to shale, normalization systems 93 and 94 (see FIGURE 1) are coupled to the outputs of count rate meters 31 and 34. These systems each may comprise a potentiometer having an input coupled to the appropriate count rate meter 31 or 34 and an output coupled to the recorder. Normalization of the two traces 23 and 24 is carried out by locating the borehole tool 16 in a good reference shale formation and adjusting the potentiometers of the systems 93 and 94 whereby the two traces 23 and 24 reflect the same excursions in the reference shale. Shale is preferred as a reference due to its high effective porosity and relatively high thermal neutron absorption cross section.

The charts of the recorders 25 and 59 of FIGURES 1 and 4, respectively, are driven in correlation with depth by a measuring reel 95 and suitable connection illustrated at 96. In addition, a depth indicator 97 may be employed to obtain a depth indication for use with the multichannel time analyzer 20.

In operating the system of FIGURE 4, the time windows obtained with delay and linear gates 50 and 51 may be of the order of 100 microseconds each, beginning, respectively at about 700 microseconds and 1000 microseconds following the end of each neutron burst.

In one embodiment, the pulse height analyzer 32 may be of the type manufactured by Hamner Electronics Company, Inc., Princeton, N.J., Model No. N-603.

The delay and linear gates 30, 33, 50, and 51, each may comprise a first monostable multivibrator actuated by the sync pulses and adjusted for a predetermined time delay for controlling a second monostable multivibrator adjusted to provide the desired time window. The output of the second multivibrator may be coupled to an AND gate which also is coupled to the output of the desired radiation detector for passage of radiation during the time window selected.

The log count rate meters 53 and 54 may be of the type manufactured by Victoreen Instrument Company, Cleveland, Ohio, Model CRM–3C. The multichannel time analyzer 20 may be of the type manufactured by the Technical Measurement Corporation, New Haven, Conn., Model CN–110, including a plug-in Model 211 Time-Of-Flight-Logic Circuit. Readout 21 may be an oscilloscope or a suitable X–Y plotter.

Now that the invention has been described, modifications will become apparent to those skilled in the art, and it is intended to cover such modifications which fall within the scope of the appended claims.

What is claimed is:
1. A method of differentiating between the various formations traversed by a borehole comprising the steps of:
   irradiating the formations with bursts of fast neutrons spaced in time,
   detecting thermal neutrons resulting from said irradiation,
   detecting thermal-neutron capture gamma rays resulting from said irradiation,
   producing at least one measurement representative of the intensitly of thermal neutrons detected,
   producing at least one measurement representative of the intensity of thermal-neutron capture gamma rays detected,
   from radiation detected during at least two time periods following the ends of said neutron bursts, producing a measurement indicative of the macroscopic absorption cross section of the materials in the formations for thermal neutrons,
   comparing said gamma ray and thermal neutron measurements to obtain a correction function, and
   with said correction function, modifying said measurement indicative of the macroscopic adsorption cross section to obtain a corrected measurement which re- flects a relatively low macroscopic absorption cross section when a first type of formation is present and a relatively large macroscopic absorption cross section when a second type of formation is present, both types of said formations generally exhibiting a large macroscopic cross section.

2. A method of differentiating between the various formations traversed by a borehole comprising the steps of:

irradiating the formations with bursts of fast neutrons spaced in time, detecting thermal neutrons resulting from said irradiation, detecting thermal-neutron capture gamma rays resulting from said irradiation, producing at least one measurement representative of the intensity of thermal neutrons detected, producing at least one measurement representative of the intensity of the thermal-neutron capture gamma rays detected, said gamma ray measurement produced reflecting a relatively high gamma ray intensity when salt-water formations are present and a relatively low gamma ray intensity when shale formations are present, from radiation detected during the last two time periods following the end of said neutron bursts, obtaining a measurement indicative of the macroscopic absorption cross section of the materials in the formations for thermal neutrons, comparing said gamma ray and thermal neutron measurements to obtain a correction function having a value which varies in one direction when shale is present in the formations and in an opposite direction when salt water is present, and with said correction function, modifying said measurement indicative of the macroscopic adsorption cross section to obtain a corrected measurement which reflects a relatively low macroscopic absorption cross section when shale is present and a relatively large macroscopic absorption cross section when salt water is present.

3. The method of claim 1 wherein:

said measurement indicative of the macroscopic absorption cross section of the materials in the formations is produced from thermal neutrons detected during at least two time periods following the end of said neutron bursts.

4. The method of claim 1 wherein:

the ratio between said thermal neutron and gamma ray measurements is formed to obtain said correction function and the product is formed between said correction function and said macroscopic absorption cross section to obtain said corrected measurement.

5. The method of claim 2 wherein:

said macroscopic absorption cross section measurement is obtained from thermal neutrons detected during at least two time periods following the end of each neutron burst, forming the ratio between said thermal neutron and gamma ray measurements to obtain said correction function, and multiplying said correction function with said measurement indicative of the macroscopic absorption cross section to obtain said corrected measurement.

6. A radioactive well logging system comprising:

a pulsed neutron source for irradiating the formations traversed by a borehole with bursts of fast neutrons spaced in time, a thermal neutron detector spaced from said source for detecting thermal neutrons resulting from the irradiation of said formations, a gamma ray detector spaced from said source for detecting thermal-neutron capture gamma rays resulting from the irradiation of said formations, means for passing said source and said detectors through a borehole to investigate formations of interest, means for producing at least one measurement representative of the intensity of thermal neutrons detected, means for producing at least one measurement representative of the intensity of thermal-neutron capture gamma rays detected, said gamma ray measurements produced reflecting a relatively high gamma ray intensity when salt-water formations are present and a relatively low gamma ray intensity when shale formations are present, means responsive to thermal neutrons detected at least during two time periods following the end of neutron bursts for obtaining a first function indicative of the macroscopic absorption cross section of said formations for thermal neutrons, means for comparing said thermal neutron and gamma ray measurements to obtain a correction function having a value which varies in one direction when shale is present in the formations and in an opposite direction when salt water is present, and means for applying said correction function to said first function to obtain a corrected function which reflects a relatively low macroscopic absorption cross section when shale is present and a relatively large macroscopic absorption cross section when salt water is present.

References Cited

UNITED STATES PATENTS

| | | |
|---|---|---|
| 2,867,728 | 1/1959 | Pollock. |
| 2,949,535 | 8/1960 | Scherbatskoy. |
| 2,991,364 | 7/1961 | Goodman. |
| 3,133,195 | 5/1964 | Jones et al. _____ 250—83 |

OTHER REFERENCES

A. H. Youmans et al.: "Neutron Lifetime, A New Nuclear Log," Journal of Petroleum Technology, March 1964, pp. 319–328.

RALPH G. NILSON, *Primary Examiner.*

A. B. CROFT, *Assistant Examiner.*

U.S. Cl. X.R.

250—83.6, 83.1

UNITED STATES PATENT OFFICE
CERTIFICATE OF CORRECTION

Patent No. 3,420,998                                    January 7, 1969

William R. Mills, Jr.

It is certified that error appears in the above identified patent and that said Letters Patent are hereby corrected as shown below:

Column 2, line 52, "unkown" should read -- unknown --. Column 3, line 48 and column 4, line 11, "main", each occurrence should read -- mean --. Column 5, line 58, "themal" should read -- thermal --. Column 6, line 67 "ends" should read -- end --; same column 6, line 74 and column 7, line 36, "adsorption", each occurrence, should read -- absorption --. Column 7, line 25, "the last" should read -- at least --.

Signed and sealed this 17th day of March 1970.

(SEAL)
Attest:

Edward M. Fletcher, Jr.                               WILLIAM E. SCHUYLER, JR.
Attesting Officer                                          Commissioner of Patents